US011196859B1

(12) United States Patent
Yin

(10) Patent No.: US 11,196,859 B1
(45) Date of Patent: Dec. 7, 2021

(54) ROBOCALL DETECTION

(71) Applicant: MITEL NETWORKS CORPORATION, Ontario (CA)

(72) Inventor: Howard Yin, Saratoga, CA (US)

(73) Assignee: Mitel Networks Corporation, Ontario (CA)

( * ) Notice: Subject to any disclaimer, the term of this patent is extended or adjusted under 35 U.S.C. 154(b) by 0 days.

(21) Appl. No.: 17/163,946

(22) Filed: Feb. 1, 2021

(51) Int. Cl.
*H04M 3/00* (2006.01)
*H04M 3/436* (2006.01)
*H04M 3/42* (2006.01)
*H04M 3/22* (2006.01)

(52) U.S. Cl.
CPC ......... *H04M 3/436* (2013.01); *H04M 3/2281* (2013.01); *H04M 3/42042* (2013.01); *H04M 3/42059* (2013.01); *H04M 2203/2027* (2013.01)

(58) Field of Classification Search
CPC .. H04M 3/46; H04M 3/2281; H04M 3/42042; H04M 3/42059; H04M 2203/2027
USPC ........................... 379/201.01, 265.01–265.14
See application file for complete search history.

(56) References Cited

U.S. PATENT DOCUMENTS

| | | | | |
|---|---|---|---|---|
| 9,706,048 | B2* | 7/2017 | Russell | H04L 65/1016 |
| 10,523,814 | B1* | 12/2019 | Moore | H04M 3/436 |
| 2003/0156695 | A1* | 8/2003 | Brown | H04M 3/22 |
| | | | | 379/188 |
| 2015/0003600 | A1* | 1/2015 | Bucko | H04M 3/436 |
| | | | | 379/210.02 |
| 2017/0163803 | A1* | 6/2017 | Russell | H04L 65/1079 |
| 2019/0174000 | A1* | 6/2019 | Bharrat | H04M 3/42059 |
| 2019/0200230 | A1* | 6/2019 | Flaks | H04M 15/47 |
| 2020/0195775 | A1* | 6/2020 | Gallagher | H04M 1/66 |
| 2020/0252504 | A1* | 8/2020 | Kreiner | H04L 65/1046 |
| 2021/0037135 | A1* | 2/2021 | Meredith | H04M 3/4365 |
| 2021/0092223 | A1* | 3/2021 | Gallagher | H04M 1/66 |
| 2021/0181818 | A1* | 6/2021 | Li | H01L 23/467 |

OTHER PUBLICATIONS

J. Rosenberg et al., "SIP: Session Initiation Protocol," Request for Comments: 3261, Jun. 2002, pp. 1-269.
Alleven, Monica "TNS uses big data, machine learning to foil robocalls", www.fiercewireless.com/wireless, Aug. 23, 2018.
Huichen et al., "A Machine Learning Approach To Prevent Malicious Calls Over Telephony Networks," www.arxiv.org, 1804.02566v1 [cs.CR], Apr. 7, 2018.
Bordjiba et al., "Data-driven approach for automatic telephony threat analysis and campaign detection," www.sciencedirect.com, vol. 24, Mar. 2018, pp. 5131-5141.
Miller, D., "Marchex Updates Anti-Robocall Service Using Elements of AI and Voice Biometrics," www.opusresearch.net, Nov. 7, 2019.

\* cited by examiner

Primary Examiner — William J Deane, Jr.

(57) ABSTRACT

A method of detecting robocalls includes generating at least one of an identification (ID) spoofing score, a number similarity score, and a call length prediction request for a telephone call request. The method further includes generating a robocall predictor score based at least in part on the call length prediction score and the ID spoofing score, and rejecting the telephone call request when the robocall predictor score indicates the telephone call request is invalid.

20 Claims, 6 Drawing Sheets

ROBOCALL DETECTION

FIELD

Embodiments relate generally to processing of telephone calls and machine learning in computing systems, and more particularly, to an online learning method and system for detecting robocalls.

BACKGROUND

A robocall is a telephone call that uses a computerized auto-dialer to deliver an unsolicited pre-recorded message, as if from a robot. Robocalls are often associated with political and telemarketing phone campaigns. Robocalls from computerized auto-dialers are now delivering billions of pre-recorded telephone calls every year, bogging down phone systems and annoying users. Spammers are also getting more sophisticated by adopting new technologies like caller identification (ID) spoofing and artificial intelligence (AI) based auto-calling to make robocalls harder to detect. While traditional telephone companies (telcos) and cloud computing voice over Internet Protocol (IP) (VoIP) carriers seek to eradicate robocalls, the telephone industry reports widespread incidents that are still not being resolved through current detection methods.

Existing attempts to combat robocalls are typically implemented as applications (apps) running on mobile phones (e.g., American Telephone and Telegraph (AT&T) Call Protect, T-Mobile Name ID, Truecaller, RoboKiller, etc.). Even with such products being used, large numbers of robocalls are still reaching users. These apps typically compare caller IDs to databases of known spam phone numbers and block lists of individual users to determine if a telephone call should be classified as a spam call and rejected. This approach is reactive instead of proactive (since the attempted mitigation of robocalls only occurs on the mobile phone) and is inadequate.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawings and accompanying written description to refer to the same or like parts.

DETAILED DESCRIPTION

Embodiments of the present invention provide a method and system for automatically detecting robocalls. Embodiments apply a plurality of machine learning models to predict classifications of incoming telephone call requests as robocalls or legitimate calls. Calls predicted to be legitimate are delivered, but calls predicted to be robocalls are rejected. In an embodiment, the plurality of machine learning models includes at least an ID spoofing binary classification model and a call length regression model.

Figure 1:
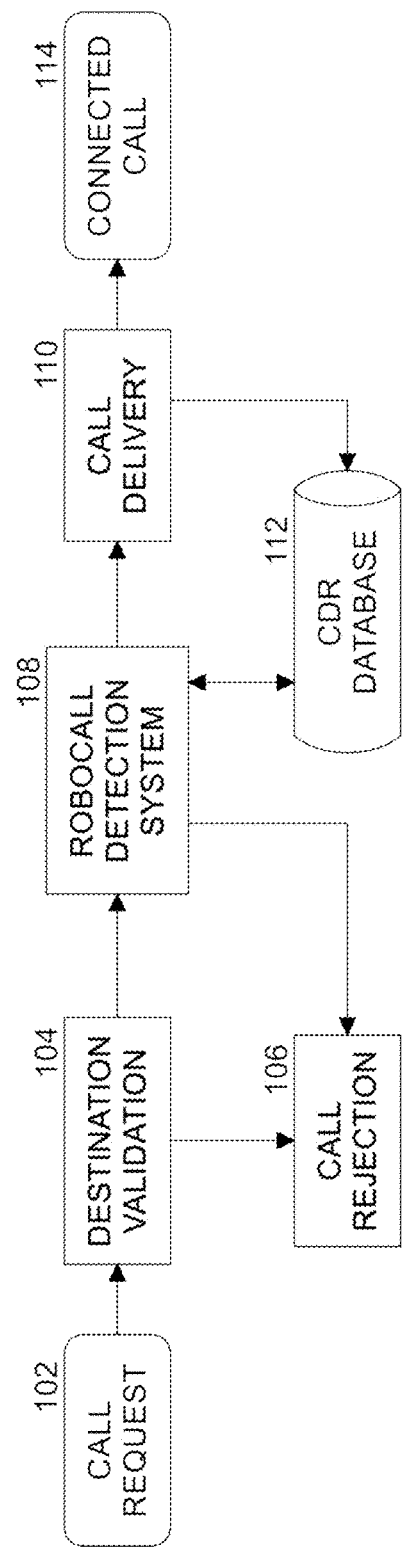
FIG. 1 illustrates a robocall detection system in a telephone call processing system according to some embodiments.

FIG. 1 illustrates a robocall detection system 108 in a telephone call processing system 100 according to some embodiments. A telephone call request 102 is received by telephone call processing system 100. In an embodiment, call request 102 is formatted and handled according to the Session Initiation Protocol (SIP), Network Working Group Request for Comments (RFC) 3261, 2002, available on the Internet at tools.ietf.org*html*rfc3261 (with "/" being replaced with "*" to prevent live links). In another embodiment, call request 102 is also formatted and handled according to the Location Conveyance for the Session Initiation Protocol, Network Working Group RFC 6442, 2011, available on the Internet at tools.ietf.org*html*rfc6442 (with "/" being replaced with "*" to prevent live links). The SIP is a signaling protocol used for initiating, maintaining, and terminating real-time sessions that include voice, video and messaging applications. The SIP is used for signaling and controlling multimedia communication sessions in applications of Internet telephony for voice and video calls, in private IP telephone systems, in instant messaging over IP networks, as well as mobile phone calling over long-term evolution (LTE) networks (VoLTE). The SIP defines the specific format of messages exchanged and the sequence of communications for cooperation of the participants. The Location Conveyance for SIP includes information regarding conveying geographic location information. Call request 102 includes fields such as destination number (e.g., the username of the SIP uniform resource identifier (URI)), call information (Call-Info), caller number and/or ID (Call-ID), geolocation, timestamp, and so on.

Destination validation 104 analyzes call request 102 to determine if the destination is a valid and operational telephone number (e.g., not invalid, not out of service, or cannot be routed). If the destination is invalid, call rejection 106 rejects the call request. If the destination is valid, the call request is passed to robocall detection system 108. Robocall detection system 108 analyzes call request 102 and predicts whether the call is a robocall or a legitimate call. If the call is predicted to be a robocall, call rejection 106 rejects the call request and robocall detection system 108 stores information about the rejected call request in call detail record (CDR) database 112. If the call is not predicted to be a robocall (e.g., a valid and legitimate call), then the call is delivered by call delivery 110 as connected call 114 and call delivery 110 stores information about the connected call 114 in CDR database 112. Robocall detection system 108 uses historical call data from CDR database 112 to train a plurality of machine learning models within the robocall detection system to continuously improve accuracy and performance of detecting robocalls.

Figure 2:
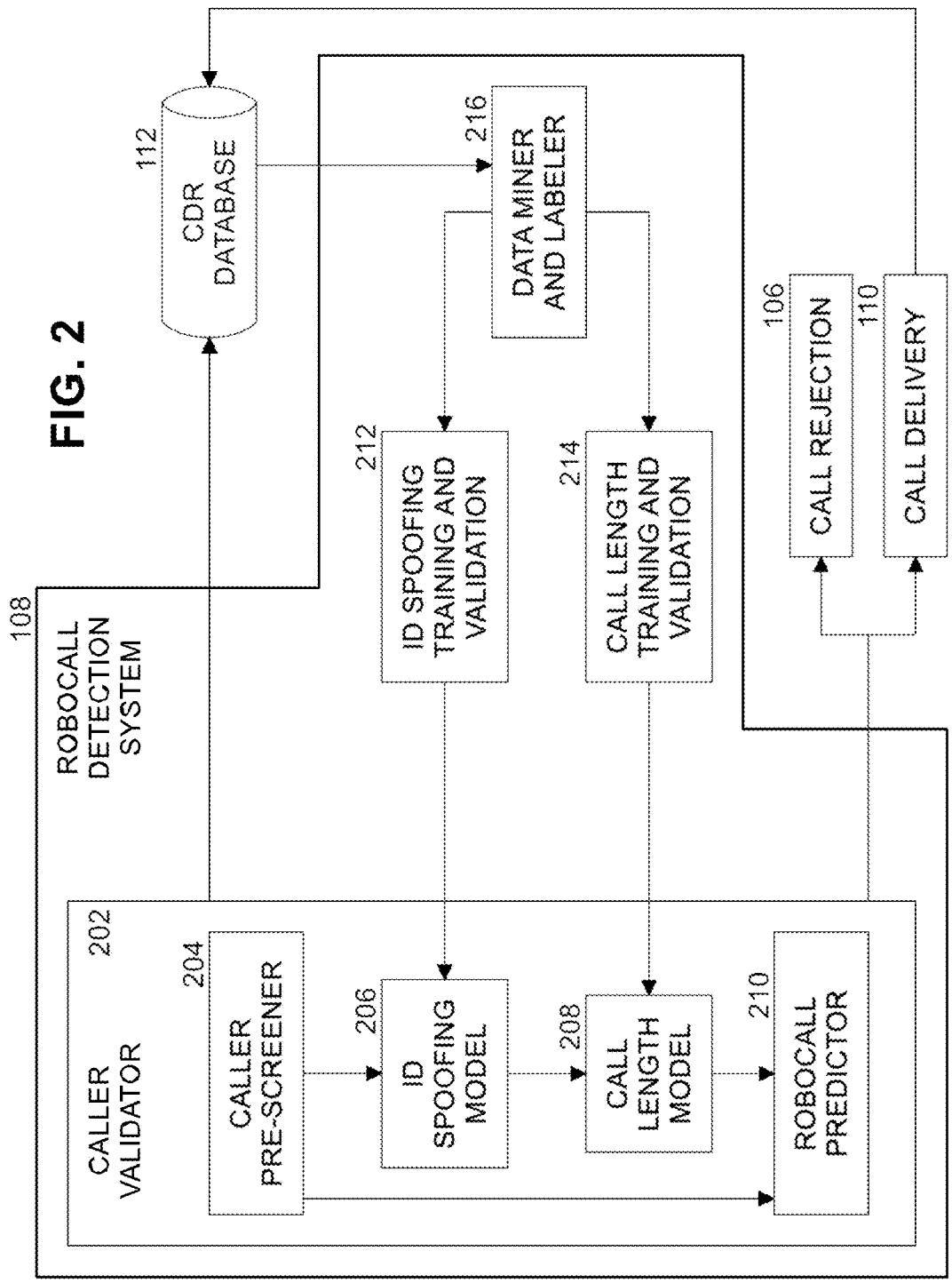
FIG. 2 illustrates a robocall detection system according to some embodiments.

FIG. 2 illustrates a robocall detection system 108 according to some embodiments. In an embodiment, robocall detection system 108 includes caller validator 202, which includes caller pre-screener 204, ID spoofing model 206, call length model 208, and robocall predictor 210. In an embodiment, at least a portion of caller validator 202 is implemented in a private branch exchange (PBX) business telephone system (not shown in FIG. 2) and one or more of pre-screener 204, ID spoofing model 206, call length model 208, and robocall predictor 210 are implemented in a computing system (not shown in FIG. 2), such as a computer server communicatively coupled to the PBX. In this embodiment, communications between caller validator 202 and one or more of caller pre-screener 204, ID spoofing model 206, call length model 208, and robocall predictor 210 may be implemented using web service representational state transfer (REST) application programming interface (API) requests and responses.

Caller validator 202 analyzes call request 102 to predict whether the call should be rejected by call rejection 106 or delivered by call delivery 110, and stores information about the call in CDR database 112. Caller validator 202 calls caller pre-screener 204, which communicates to the caller (e.g., the originator of call request 102) and asks the caller, using a pre-recorded audio message, to input a number using the caller's telephone keypad. In an embodiment, the number (also called a nonce) is randomly generated by caller pre-screener 204 for every call using known methods for generating random or pseudorandom numbers. That is, the number is usually a different number for every call. In an embodiment, the number is a one-digit number. In another embodiment, the number is a two-digit number. Other numbers of digits for the number can also be used. The request for the caller to enter the random number is communicated to the caller before the call is delivered to the destination by call delivery 110.

The caller is required to input the random number. If the caller does not enter the correct randomly generated number, this is an indication that the caller is a computer program and not a human being. Although it is possible that a human caller made a mistake in entering the number, it is more likely in this situation that the caller is an automatic dialer. In this case, call request 102 is indicated to be invalid, rejected by call rejection 106 and information about the rejected call is stored in CDR database 112. In an embodiment, this information includes one or more of a caller pre-screen result (whether the call is valid or invalid), caller number, destination number, day, time, caller geographic information, contact list presence (e.g., whether the caller number is in the contact list of the destination number), and call history (e.g., the call records of the last N days of the called user, where N is a natural number). In an embodiment, Bigtable, a compressed high performance proprietary data storage system built on the Google file system and other technologies, available from Google, Inc., is used to implement CDR database 112. In other embodiments, other database technologies may be used to implement the CDR database.

In an embodiment, an additional check may be implemented by caller pre-screener 204, whereby caller pre-screener accesses a contact list of the destination number. If the caller number is not in the contact list, then the call is rejected and the information about the call is stored in CDR database 112. Rejected call information may include one or more of call request 102, caller number, destination number, day, time, call length, caller geographic information, and contact list presence.

If the caller does enter the correct randomly generated number (and in an embodiment if the caller number is in the contact list of the destination number), this is an indication that the caller is a human being and not a computer program. However, to provide better robocall prediction according to embodiments, additional processing is performed by robocall detection system 108. If a non-human caller is somehow able to adapt to the requirement to enter the randomly generated number or access the contact list of the destination number, robocall detection system 108 provides additional protections against robocalls. In this case, caller validator 202 calls ID spoofing model 206, passing in one or more of the caller pre-screen result, caller number, destination number, day, time, caller geographic information, contact list presence, and call history. In another embodiment, caller pre-screener 204 calls ID spoofing model 206.

In an embodiment, ID spoofing model 206 is a binary classification machine learning model that predicts potential caller ID spoofing by the caller. In an embodiment, ID spoofing model 206 is implemented as a Cloud Auto ML model available from Google, Inc. In other embodiments, other implementations of the ID spoofing model may be used. It has been observed that receiving calls from highly similar and unknown caller numbers is indicative of robocalls. ID spoofing model 206 analyzes call request 102 and compares the caller number and the destination number to produce a number similarity score. In one embodiment, the number similarity score measures the similarity between the caller number and the destination number (for example, whether the two numbers are in the same area code). The number similarity score may be a number between 0 and 100 (or 0 and 1, for example), with a higher number indicating a higher similarity.

In an embodiment, an additional check may be implemented by IS spoofing model 206, whereby IS spoofing model 206 accesses the contact list of the destination number. If the caller number is not in the contact list, then the call is rejected and the information about the call is stored in CDR database 112.

In an embodiment, ID spoofing model 206 also compares the day of the week and time of day of call request 102, along with the number similarity score, to determine a composite ID spoofing score. In an embodiment, the ID spoofing score is a normalized score between 0 and 100 (or 0 and 1, for example), with calls with higher scores being indicated as being more likely to be a robocall than calls with lower scores. In an embodiment, a pre-determined threshold is set for the ID spoofing score whereby if the score meets or exceeds the threshold then the call is predicted to be a robocall and if the score is less than the threshold then the call is predicted to be a legitimate call. In one embodiment, the ID spoofing score is a measure of the probability that the call is a robocall.

ID spoofing model 206 is constructed based on labeled call record datasets. A label is a binary value which indicates if the call was a robocall. Each record in the call record dataset includes data elements such as call pre-screen result, number similarity score, day, time, caller geographic information, contact list presence, and conversation history. In an embodiment, the Cloud Auto ML engine uses the datasets to create ID spoofing model 206 which can predict how likely an incoming call is a robocall. The outcome is a decimal number between 0 and 1, with a higher score meaning a higher possibility that the call is a robocall.

Next, caller validator 202 calls call length model 208, passing in one or more of the number similarity score, the ID spoofing score, timestamp (including day, time, and call duration), caller geographic information, contact list presence, and call history. In another embodiment, ID spoofing model 206 calls call length model 208. In an embodiment, call length model 208 is a regression machine learning model that predicts potential robocalls by the caller based at least in part on call lengths (e.g., time durations of calls). In an embodiment, call length model 208 is implemented as a Cloud Auto ML model available from Google, Inc. In other embodiments, other implementations of the model may be used. It has been observed that short calls (less than two or three seconds, for example) are indicative of robocalls. That is, when a call is answered at the destination number and the recipient realizes that the call is a robocall, the recipient quickly terminates the call. The history of short calls from the caller number (e.g., retrieved from CDR database 112) can be used by call length model 208 to generate a call length prediction score.

In an embodiment, an additional check may be implemented by call length model 208, whereby call length model 208 accesses the contact list of the destination number. If the caller number is not in the contact list, then the call is rejected and the information about the call is stored in CDR database 112. In an embodiment, call length model 208 also compares the day of the week and time of day of call request 102, along with the call lengths, to determine a call length prediction score.

In an embodiment, the call length prediction score is a normalized score between 0 and 100 (or 0 and 1, for example), with calls with higher scores being indicated as being more likely to be a robocall than calls with lower scores. In an embodiment, a pre-determined threshold is set for the call length prediction score whereby if the score meets or exceeds the threshold then the call is predicted to be a robocall and if the score is less than the threshold then the call is predicted to be a legitimate call. In one embodiment, the call length prediction score is a measure of the probability that the call is a robocall.

Call length model 208 is constructed based on labeled call record datasets. The target label is the actual call length. Each record includes data elements such as call pre-screen result, number similarity score, day, time, caller geographic information, contact list presence, and conversation history. In an embodiment, the Cloud Auto ML engine uses the datasets to create call length model 208 which can be used to predict the potential length of the incoming call. Robocalls usually are very short and typically do not last for more than a few seconds.

Next, caller validator 202 calls robocall predictor 210, passing in the ID spoofing score generated by ID spoofing model 206 and the call length prediction score generated by call length model 208. Robocall predictor 210 generates a robocall predictor score based at least in part on the ID spoofing score and the call length prediction score. In an embodiment, robocall predictor 210 weights each of the two scores and logically combines them. In one embodiment, each score is given a 50% (equal) weight for generating the robocall predictor score. In other embodiments, other weighting (where the sum of the weights of the two scores equal 100%) may also be used. For example, processing logic of robocall predictor 210 may determine if the predicted talk time as indicated by the call length prediction score is less than or equal to five seconds or the ID spoofing score is greater than or equal to 95 then robocall predictor predicts that the current call is a robocall. Other processing logic and/or rules may be implemented in robocall predictor 210 to predict robocalls based at least in part on the ID spoofing score and the call length prediction score as needed to produce better predictions.

In an embodiment, the robocall predictor score is a normalized score between 0 and 100 (or 0 and 1, for example), with calls with higher scores being indicated as being more likely to be a robocall than calls with lower scores. In an embodiment, a pre-determined threshold is set for the robocall predictor score whereby if the score meets or exceeds the threshold then the call is predicted to be a robocall and if the score is less than the threshold then the call is predicted to be a legitimate call. In one embodiment, the robocall predictor score is a measure of the probability that the call is a robocall.

Caller validator 202 uses the robocall predictor score to decide whether to reject call request 102 and have the call rejected by call rejection 106, or to accept the call request and have the call delivered by call delivery 110. When the call is rejected as a robocall, information about the rejected call is stored in CDR database 112 by caller validator 202. When the call is accepted as legitimate, information about the delivered call is stored in CDR database 112 by either caller validator 202 or call delivery 110. Call information may include one or more of call result, call request 102, caller number, destination number, day, time, call length, caller geographic information, and contact list presence.

In one embodiment, instead of rejecting the call outright when the call is predicted to be a robocall, robocall detection system 108 transfers the call back to the caller, setting up a "dead loop" (e.g., whereby the caller calls itself back). This countermeasure results in the caller being occupied with the callbacks and thus cannot keep making robocalls (similar in theory to a denial-of-service attack).

Prior to use, ID spoofing model 206 and call length model 208 are trained and validated. Data miner and labeler 216 obtains historical call information from CDR database 112. Data in CDR database 112 is unlabeled. In one embodiment, data miner and labeler 216 gets call information from a random sample of calls from CDR database 116. Data miner and labeler 116 filters the call information to remove noise from the data, reformats the call information, and labels selected data items of the call information with tags. For example, caller ID and call length for each sampled call are tagged so that ID spoofing model 206 and call length model 208, respectively, can be trained with the tagged data. Training of the models includes identifying target labels, establishing logical connections between call data items and target labels, and generating weights of each call data item for consideration by the models.

ID spoofing training and validation 212 uses at least tagged data for caller IDs to train ID spoofing model 206. ID spoofing model 206 in one embodiment is trained to discover and establish feature importance for the predicted labels based on six call data fields: day, time, caller geographic information, number similarity score, contact list presence, and prescreened result. In one test case, this ID spoofing model 206 showed the results of a 98.1% accuracy rate, a 99% true positive rate and approximately a 2% false positive rate.

Call length training and validation 214 uses at least tagged data for call lengths to train call length model 208. Call length model 208 in one embodiment is trained to establish a correlation between call length and the six call data fields: day, time, caller geographic information, number similarity score, contact list presence, and prescreened result. Analysis of call length model 208 results has shown that if a call length is predicted to be extreme short, usually a few seconds, then it is more likely that the call is a robocall.

Training of ID spoofing model 206 by ID spoofing training and validation 212 and of call length model 208 by call length training and validation 214 is periodically repeated as new call history data is continuously entered into CDR database 112. This re-training may be performed at selected intervals, such as daily, every three days, weekly, bi-weekly, monthly, and so on. This ensures that the models are regularly updated to continuously improve robocall detection. Robocall prediction results may be periodically evaluated to determine if any changes are needed to weighting of scores, tags, or other model parameters.

Figure 3:
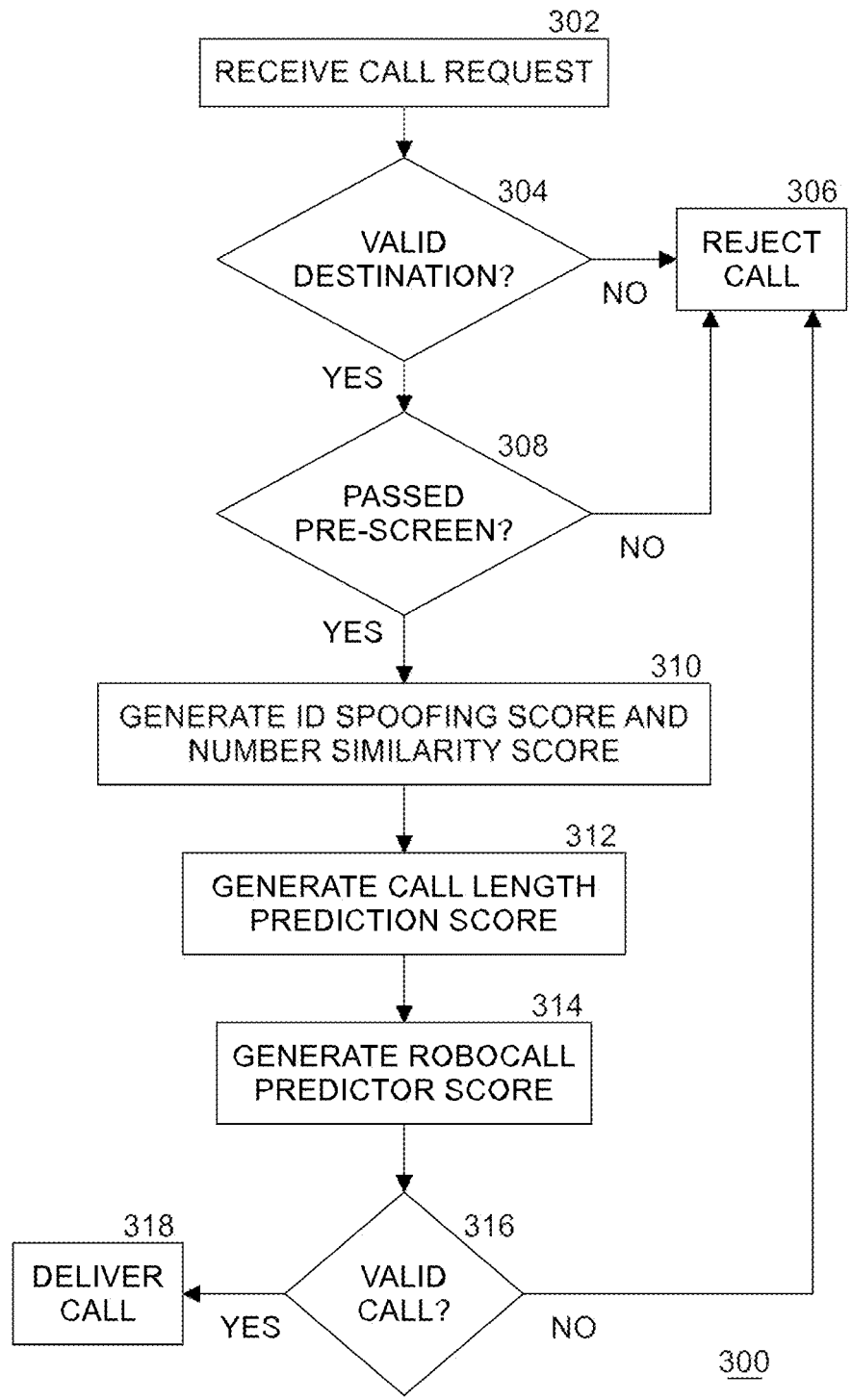
FIG. 3 is a flow diagram of robocall detection processing according to some embodiments.

FIG. 3 is a flow diagram of robocall detection processing 300 according to some embodiments. At block 302, a call request is received. At block 304, destination validation 104 determines if the destination of the call request is valid. If the destination is invalid, then call rejection 106 rejects the call request at block 306 and call processing for this call request ends. If the destination is valid, then at block 308 caller pre-screener 204 of caller validator 202 of robocall detection system 108 pre-screens the call request as described above. If the call request does not pass the pre-screen, then call rejection 106 rejects the call request at block 306 and call processing for this call ends. If the call request does pass the pre-screen, at block 310 caller validator 202 applies IP spoofing model 206 to the call request to generate an ID spoofing score and a number similarity score for the call request. Next, at block 312 call validator 202 applies call length model 208 to the call request, the ID spoofing score, and the number similarity score to generate a call length prediction score for the call request. At block 314, robocall predictor 210 of caller validator 202 of robocall detection system 108 generates a robocall predictor score as described above. If the robocall predictor score indicates that the call request is for a valid call, then at block 318 call delivery 110 delivers the call. If the robocall predictor score indicates that the call request is for an invalid call (e.g., a robocall), then at block 306 call rejection 106 rejects the call request at block 306 and call processing for this call ends.

Figure 4:
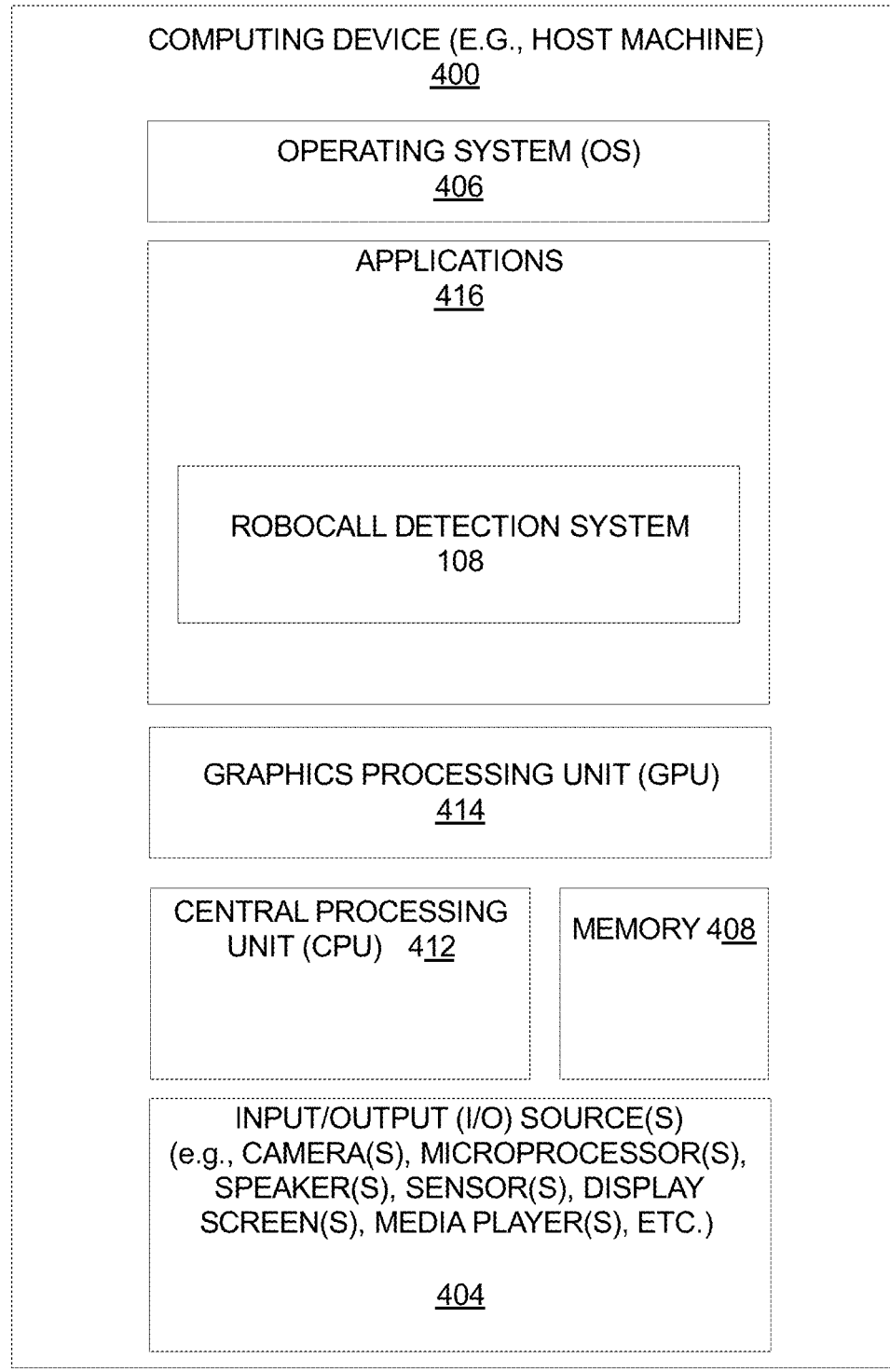
FIG. 4 illustrates a computing device employing a robocall detection system, according to an embodiment.

FIG. 4 illustrates one embodiment of a computing device 400 (e.g., a host machine) executing an application 416 for robocall detection system 108. Computing device 400 (e.g., smart wearable devices, virtual reality (VR) devices, head-mounted display (HMDs), mobile computers, Internet of Things (IoT) devices, laptop computers, desktop computers, server computers, smartphones, etc.) is shown as hosting robocall detection system 108.

In some embodiments, some or all of robocall detection system 108 may be hosted by or part of firmware of graphics processing unit (GPU) 414. In yet other embodiments, some or all of robocall detection system 100 may be hosted by or be a part of firmware of central processing unit ("CPU" or "application processor") 412.

In yet another embodiment, robocall detection system 108 may be hosted as software or firmware logic by operating system (OS) 406. In yet a further embodiment, robocall detection system 108 may be partially and simultaneously hosted by multiple components of computing device 108, such as one or more of GPU 414, GPU firmware (not shown in FIG. 4), CPU 412, CPU firmware (not shown in FIG. 4), operating system 406, and/or the like. It is contemplated that robocall detection system 108 or one or more of the constituent components may be implemented as hardware, software, and/or firmware.

Throughout the document, term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

Computing device 400 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 400 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, computing device 400 may include a mobile computing device employing a computer platform hosting an integrated circuit ("IC"), such as system on a chip ("SoC" or "SOC"), integrating various hardware and/or software components of computing device 400 on a single chip.

As illustrated, in one embodiment, computing device 400 may include any number and type of hardware and/or software components, such as (without limitation) GPU 414, a graphics driver (also referred to as "GPU driver", "graphics driver logic", "driver logic", user-mode driver (UMD), UMD, user-mode driver framework (UMDF), UMDF, or simply "driver") (not shown in FIG. 4), CPU 412, memory 408, network devices, drivers, or the like, as well as input/output (I/O) sources 404, such as touchscreens, touch panels, touch pads, virtual or regular keyboards, virtual or regular mice, ports, connectors, etc.

Computing device 400 may include operating system (OS) 406 serving as an interface between hardware and/or physical resources of the computer device 400 and a user. It is contemplated that CPU 412 may include one or more processors, such as processor(s) 402 of FIG. 4, while GPU 414 may include one or more graphics processors (or multiprocessors).

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated that some processes of the graphics pipeline as described herein are implemented in software, while the rest are implemented in hardware. A graphics pipeline (such as may be at least a part of robocall detection system 108) may be implemented in a graphics coprocessor design, where CPU 412 is designed to work with GPU 414 which may be included in or co-located with CPU 412. In one embodiment, GPU 414 may employ any number and type of conventional software and hardware logic to perform the conventional functions relating to graphics rendering as well as novel software and hardware logic to execute any number and type of instructions.

Memory 408 may include a random-access memory (RAM) comprising application database having object information. A memory controller hub (not shown in FIG. 4) may access data in the RAM and forward it to GPU 414 for graphics pipeline processing. RAM may include double data rate RAM (DDR RAM), extended data output RAM (EDO RAM), etc. CPU 412 interacts with a hardware graphics pipeline to share graphics pipelining functionality.

Processed data is stored in a buffer in the hardware graphics pipeline, and state information is stored in memory 408. The resulting image is then transferred to I/O sources 404, such as a display component for displaying of the image. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

Memory 408 may comprise a pre-allocated region of a buffer (e.g., frame buffer); however, it should be understood by one of ordinary skill in the art that the embodiments are not so limited, and that any memory accessible to the lower graphics pipeline may be used. Computing device 400 may further include an input/output (I/O) control hub (ICH) (not shown in FIG. 4), as one or more I/O sources 404, etc.

CPU 412 may include one or more processors to execute instructions to perform whatever software routines the computing system implements. The instructions frequently involve some sort of operation performed upon data. Both data and instructions may be stored in system memory 408 and any associated cache. Cache is typically designed to have shorter latency times than system memory 408; for example, cache might be integrated onto the same silicon chip(s) as the processor(s) and/or constructed with faster static RAM (SRAM) cells whilst the system memory 408 might be constructed with slower dynamic RAM (DRAM) cells. By tending to store more frequently used instructions and data in the cache as opposed to the system memory 408, the overall performance efficiency of computing device 400 improves. It is contemplated that in some embodiments, GPU 414 may exist as part of CPU 412 (such as part of a physical CPU package) in which case, memory 408 may be shared by CPU 412 and GPU 414 or kept separated.

System memory 408 may be made available to other components within the computing device 400. For example, any data (e.g., input graphics data) received from various interfaces to the computing device 400 (e.g., keyboard and mouse, printer port, Local Area Network (LAN) port, modem port, etc.) or retrieved from an internal storage element of the computer device 400 (e.g., hard disk drive) are often temporarily queued into system memory 408 prior to being operated upon by the one or more processor(s) in the implementation of a software program. Similarly, data that a software program determines should be sent from the computing device 400 to an outside entity through one of the computing system interfaces, or stored into an internal storage element, is often temporarily queued in system memory 408 prior to its being transmitted or stored.

Further, for example, an ICH may be used for ensuring that such data is properly passed between the system memory 408 and its appropriate corresponding computing system interface (and internal storage device if the computing system is so designed) and may have bi-directional point-to-point links between itself and the observed I/O sources/devices 404. Similarly, an MCH may be used for managing the various contending requests for system memory 408 accesses amongst CPU 412 and GPU 114, interfaces and internal storage elements that may proximately arise in time with respect to one another.

I/O sources 404 may include one or more I/O devices that are implemented for transferring data to and/or from computing device 400 (e.g., a networking adapter); or, for a large-scale non-volatile storage within computing device 400 (e.g., hard disk drive). User input device, including alphanumeric and other keys, may be used to communicate information and command selections to GPU 414. Another type of user input device is cursor control, such as a mouse, a trackball, a touchscreen, a touchpad, or cursor direction keys to communicate direction information and command selections to GPU 414 and to control cursor movement on the display device. Camera and microphone arrays of computer device 400 may be employed to observe gestures, record audio and video and to receive and transmit visual and audio commands.

Computing device 400 may further include network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing device 400 may vary from implementation to implementation depending upon numerous factors, such as price constraints, performance requirements, technological improvements, or other circumstances. Examples of the electronic device or computer system 400 may include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more tangible non-transitory machine-readable media having stored thereon machine-executable instructions that, when executed by one or more machines such as a computer, network of computers, or other electronic devices, may result in the one or more machines carrying out operations in accordance with embodiments described herein. A tangible non-transitory machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Machine Learning Overview

A machine learning algorithm is an algorithm that can learn based on a set of data. Embodiments of machine learning algorithms can be designed to model high-level abstractions within a data set. For example, classification algorithms can be used to determine which of several categories to which a given input belongs; regression algorithms can output a numerical value given an input; and pattern recognition algorithms can be used to generate translated text or perform text to speech and/or speech recognition.

An exemplary type of machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 5:
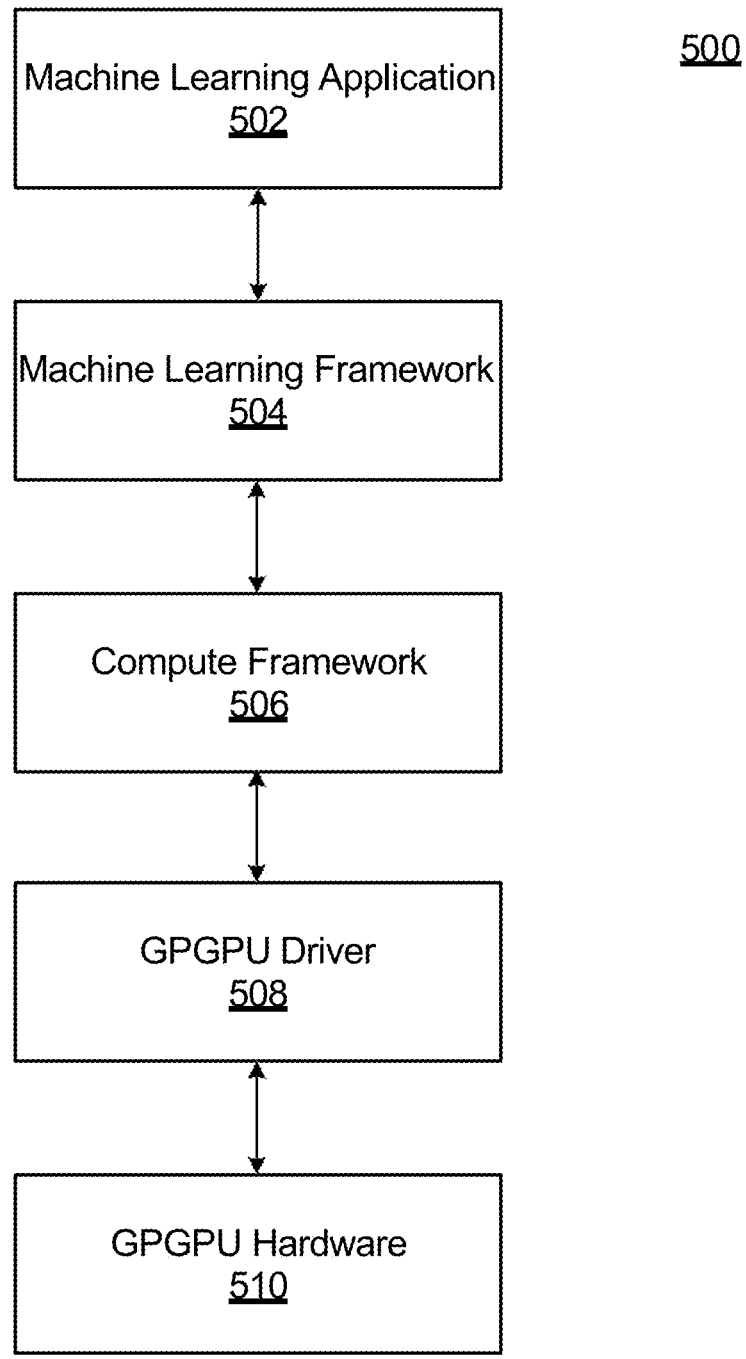
FIG. 5 illustrates a machine learning software stack, according to an embodiment.

FIG. 5 is a generalized diagram of a machine learning software stack 500. A machine learning application 502 can be configured to train a neural network using a training dataset or to use a trained deep neural network to implement machine intelligence. The machine learning application 502 (such as robocall detection system 108) can include training and inference functionality for a neural network and/or specialized software that can be used to train a neural network before deployment. The machine learning application 502 can implement any type of machine intelligence including but not limited to classification, image recognition, mapping and localization, autonomous navigation, speech synthesis, medical imaging, or language translation.

Hardware acceleration for the machine learning application 502 can be enabled via a machine learning framework 504. The machine learning framework 504 can provide a library of machine learning primitives. Machine learning primitives are basic operations that are commonly performed by machine learning algorithms. Without the machine learning framework 504, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 504. Exemplary primitives include tensor convolutions, activation functions, and pooling, which are computational operations that are performed while training a convolutional neural network (CNN). The machine learning framework 804 can also provide primitives to implement basic linear algebra subprograms performed by many machine-learning algorithms, such as matrix and vector operations.

The machine learning framework 504 can process input data received from the machine learning application 502 and generate the appropriate input to a compute framework 506. The compute framework 506 can abstract the underlying instructions provided to a GPGPU driver 505 to enable the machine learning framework 504 to take advantage of hardware acceleration via the GPGPU hardware 510 without requiring the machine learning framework 504 to have intimate knowledge of the architecture of the GPGPU hardware 510. Additionally, the compute framework 506 can enable hardware acceleration for the machine learning framework 504 across a variety of types and generations of the GPGPU hardware 510.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is well-known in the art, there are a variety of types of neural network implementations used in machine learning. One exemplary type of neural network is the feedforward network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described herein present exemplary feedforward and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different tasks.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 6:
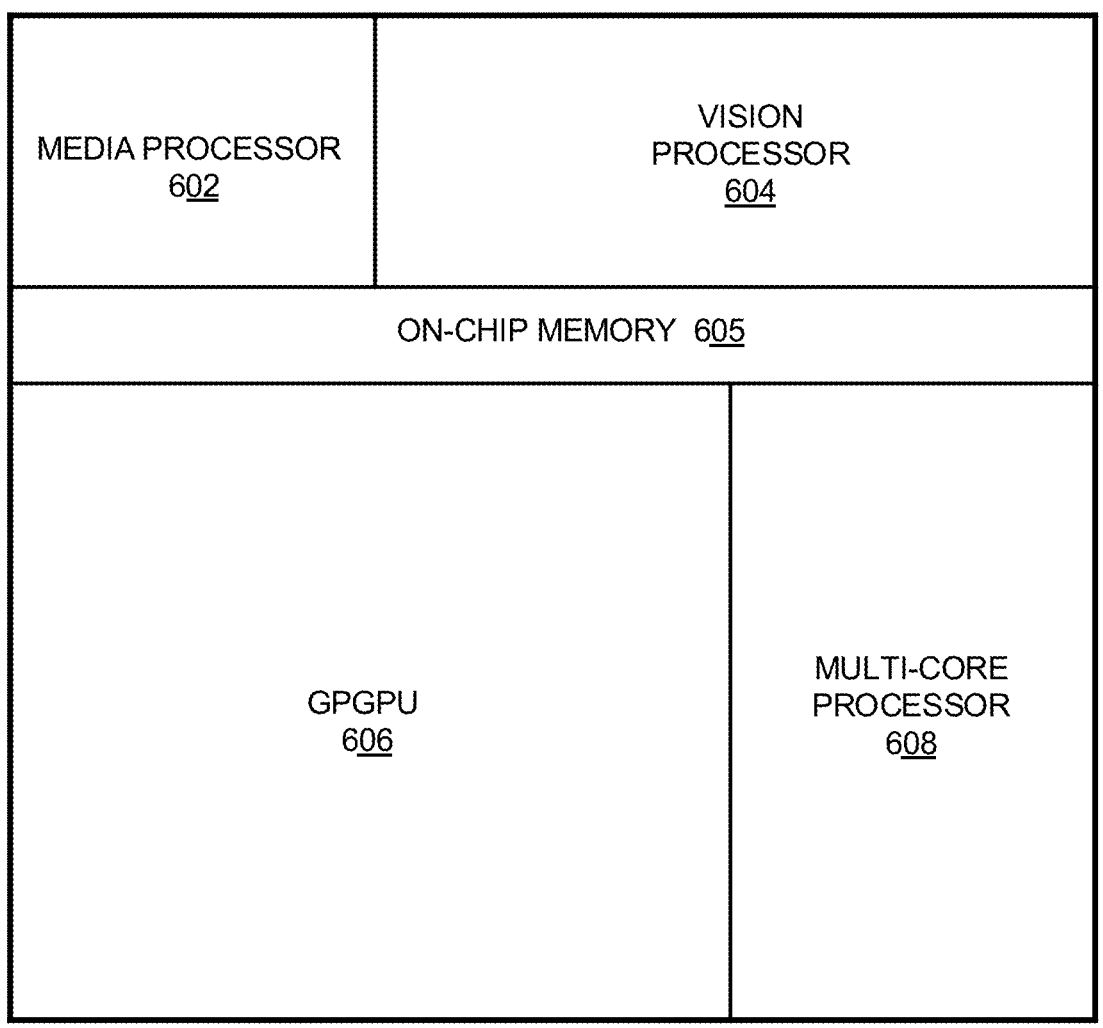
FIG. 6 illustrates an exemplary system on a chip (SOC) suitable for performing robocall detection according to some embodiments.

FIG. 6 illustrates an exemplary system on a chip (SOC) 600 suitable for performing inferencing using a trained model. One or more components of FIG. 6 may be used to implement robocall detection system 108. The SOC 600 can integrate processing components including a media processor 602, a vision processor 604, a GPGPU 606 and a multi-core processor 608. The SOC 600 can additionally include on-chip memory 605 that can enable a shared on-chip data pool that is accessible by each of the processing components. The processing components can be optimized for low power operation to enable deployment to a variety of machine learning platforms, including autonomous vehicles and autonomous robots.

The multi-core processor 608 can include control logic to assist with sequencing and synchronization of data transfers and shared memory operations performed by the media processor 602 and the vision processor 604. The multi-core processor 608 can also function as an application processor to execute software applications that can make use of the inferencing compute capability of the GPGPU 606. For example, at least a portion of the robocall detection logic can be implemented in software executing on the multi-core processor 608. Such software can directly issue computational workloads to the GPGPU 606 or the computational workloads can be issued to the multi-core processor 608, which can offload at least a portion of those operations to the GPGPU 606.

Flowcharts representative of example hardware logic, machine readable instructions, hardware implemented state machines, and/or any combination thereof for implementing computing device 400, for example, are shown in FIG. 3. The machine-readable instructions may be one or more executable programs or portion(s) of an executable program for execution by a computer processor such as the processor 414 shown in the example computing device 400 discussed above in connection with FIG. 4. The program may be embodied in software stored on a non-transitory computer readable storage medium such as a CD-ROM, a floppy disk, a hard drive, a DVD, a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowcharts illustrated in FIG. 3, many other methods of implementing the example action recognition system 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine-readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. An apparatus comprising:
 a processing device; and
 a memory device coupled to the processing device, the memory device having instructions stored thereon that, in response to execution by the processing device, cause the processing device to:
 generate at least one of an identification (ID) spoofing score and a number similarity score for a telephone call request;
 generate a call length prediction score for the telephone call request based at least in part on the at least one of the ID spoofing score and the number similarity score;
 generate a robocall predictor score based at least in part on the call length prediction score and the ID spoofing score; and
 reject the call request when the robocall predictor score indicates the telephone call request is invalid.

2. The apparatus of claim 1, wherein the instructions, when executed, cause the processing device to communicate a random number to a caller of the telephone call request and require the caller to input the random number using the caller's telephone keypad or the telephone caller request is rejected.

3. The apparatus of claim 1, wherein the instructions, when executed, cause the processing device to generate the at least one of the ID spoofing score and the number similarity score for the telephone call request using an ID spoofing machine learning model.

4. The apparatus of claim 3, wherein the instructions, when executed, cause the processing device to generate the ID spoofing score from one or more of the number similarity score, a day of a week of the call request, and a time of day of the telephone call request.

5. The apparatus of claim 3, wherein the instructions, when executed, cause the processing device to generate the call length prediction score for the telephone call request using a call length machine learning model.

6. The apparatus of claim 5, wherein the instructions, when executed, cause the processing device to generate the call length prediction score from one or more of the number similarity score, the ID spoofing score, a day of a week of the telephone call request, a time of day of the telephone call request, and a geographic information of a caller of the telephone call request.

7. The apparatus of claim 5, wherein the instructions, when executed, cause the processing device to store information about the telephone call request in a database and periodically train the ID spoofing machine learning model and the call length machine learning model using the telephone call request information in the database.

8. The apparatus of claim 1, wherein the robocall predictor score is a probability that the telephone call request is for a robocall.

9. The apparatus of claim 8, wherein the instructions, when executed, cause the processing device to reject the telephone call request when the robocall predictor score meets or exceeds a predetermined threshold.

10. The apparatus of claim 1, wherein the instructions, when executed, cause the processing device to transfer the telephone call request back to the caller, instead of rejecting the telephone call request, when the robocall predictor score indicates the telephone call request is invalid.

11. A method comprising:
 generating at least one of an identification (ID) spoofing score and a number similarity score for a telephone call request;
 generating a call length prediction score for the telephone call request based at least in part on the at least one of the ID spoofing score and the number similarity score;
 generating a robocall predictor score based at least in part on the call length prediction score and the ID spoofing score; and
 rejecting the telephone call request when the robocall predictor score indicates the call request is invalid.

12. The method of claim 11, comprising communicating a random number to a caller of the telephone call request and requiring the caller to input the random number using the caller's telephone keypad or the telephone caller request is rejected.

13. The method of claim 11, comprising generating the at least one of the ID spoofing score and the number similarity score for the telephone call request using an ID spoofing machine learning model.

14. The method of claim 13, comprising generate the ID spoofing score from one or more of the number similarity score, a day of a week of the telephone call request, and a time of day of the telephone call request.

15. The method of claim 13, comprising generating the call length prediction score for the telephone call request using a call length machine learning model.

16. The method of claim 15, comprising generating the call length prediction score from one or more of the number similarity score, the ID spoofing score, a day of a week of the telephone call request, a time of day of the telephone call request, and a geographic information of a caller of the telephone call request.

17. At least one non-transitory machine-readable storage medium comprising instructions that, when executed, cause at least one processor to:
 generate at least one of an identification (ID) spoofing score and a number similarity score for a telephone call request;
 generate a call length prediction score for the telephone call request based at least in part on the at least one of the ID spoofing score and the number similarity score;
 generate a robocall predictor score based at least in part on the call length prediction score and the ID spoofing score; and
 reject the call request when the robocall predictor score indicates the telephone call request is invalid.

18. The least one non-transitory machine-readable storage medium of claim 17 comprising instructions that, when executed, cause at least one processor to generate the at least one of the ID spoofing score and the number similarity score for the telephone call request using an ID spoofing machine learning model.

19. The least one non-transitory machine-readable storage medium of claim 18 comprising instructions that, when executed, cause at least one processor to generate the call length prediction score for the telephone call request using a call length machine learning model.

20. The least one non-transitory machine-readable storage medium of claim 19 comprising instructions that, when executed, cause at least one processor to store information about the telephone call request in a database and periodically train the ID spoofing machine learning model and the call length machine learning model using the telephone call request information in the database.

* * * * *